Jan. 10, 1961 J. A. HOWARD 2,967,579
POWER-DRIVEN CULTIVATING MACHINE OR TRACTOR
Filed Feb. 12, 1959
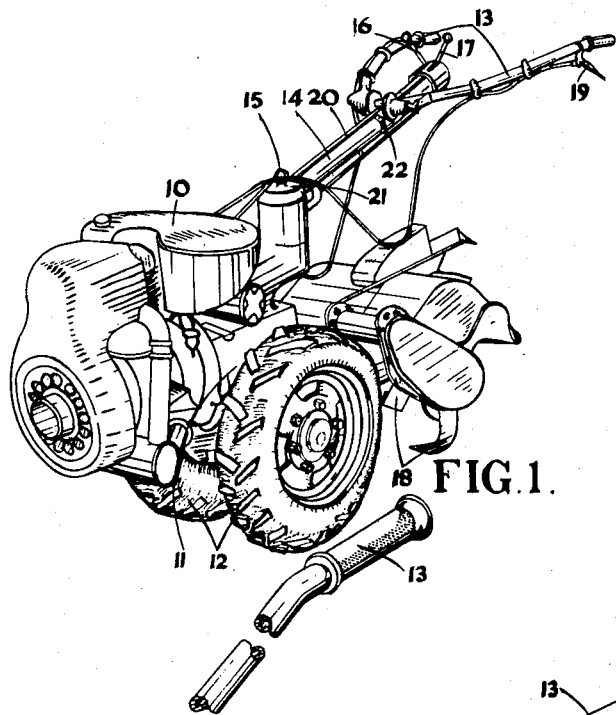
FIG.1.
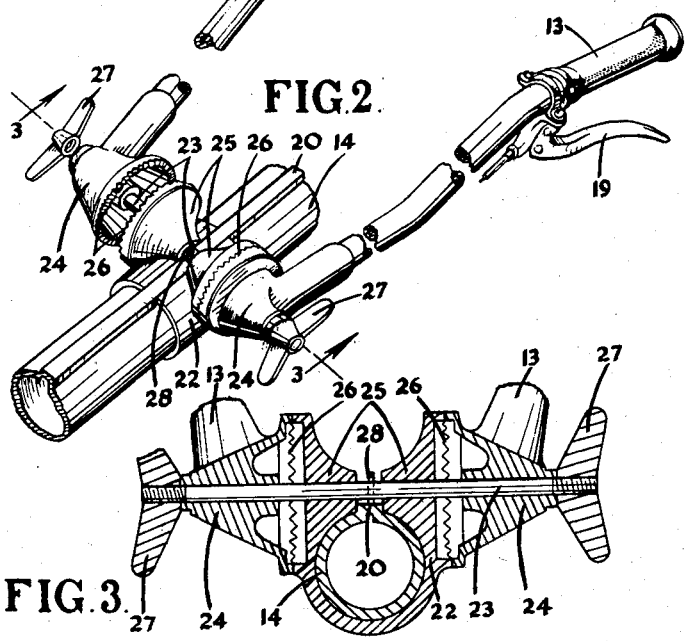
FIG.2.
FIG.3.

United States Patent Office 2,967,579
Patented Jan. 10, 1961

---

2,967,579

POWER-DRIVEN CULTIVATING MACHINE OR TRACTOR

John Arthur Howard, West Horndon, England, assignor to Rotary Hoes Limited, West Horndon, England Filed Feb. 12, 1959, Ser. No. 792,797

Claims priority, application Great Britain Feb. 18, 1958

4 Claims. (Cl. 180—19)

The invention relates to a power-driven cultivating machine or tractor of the kind provided with a handle-bar means, for a walking operator, and adapted for the attachment of an implement at the rear. It is common for implements of different shapes and sizes, and for different purposes, to be attached to such a machine or tractor, and the object of the invention is to enable the walking operator to have full control over the machine regardless of the shape, size and purpose of the attached implement.

According to the invention the handle-bar means includes a boom and at least one handle-bar supported from the boom in such a manner that it can be slid, longitudinally of the boom, into a position appropriate for an attached implement and be locked in that position. In this way adequate footroom behind the implement for the walking operator can be provided, and the handle-bar can also be slid into such a position as to enable the walking operator more easily to apply a desired downward pressure.

According to a further feature, the support for the handle-bar is in the form of a split clamp embracing the boom, the clamp being slidable along the boom when slackened.

The boom can be of circular cross-section and have a longitudinal rib, and the coacting portion of the split clamp can be a sleeve with an axial slit at one side, the rib being for fitting in the slit so as to prevent relative rotation when the clamp is slackened, and the clamping means of the clamp being for urging opposite sides of the split into engagement with the adjacent surfaces of the rib.

According to a further feature, the handle-bar is pivotally attached to its support from the boom such that it can be tilted and locked at a desired inclination, and in the case where the handle-bar includes a pair of arms with respective handles at their one corresponding ends, each of the arms can be separately pivotally attached at its opposite end to a common support from the boom such that the arm can be tilted independently of the other and be locked at a desired inclination.

In the accompanying drawings:

Figure 1 is a perspective view of one kind of power-driven cultivating machine equipped with handle-bar means in accordance with the invention;

Figure 2 is an enlarged, partially-exploded, perspective view of the handle-bar means shown in Figure 1; and Figure 3 is an enlarged sectional detail view on line 3—3 of Figure 2.

The machine shown in Figure 1 has an internal-combustion engine power plant indicated generally at 10 mounted above a gear casing 11 supported from a pair of ground-engaging wheels 12, and it has a pair of handle-bars 13 mounted from a boom 14 which is pivoted on a vertical axis at 15 from the gear casing 11 in accordance with my patent application No. 792,798 filed February 12, 1959, now abandoned. The gear casing contains gearing which, subject to the actuation of controls 16, 17, enables the engine to drive the wheels 12 and a detachable rotor of which earth-cultivating blades are shown at 18. An engine control on the left-hand handle-bar 13 is shown at 19.

The boom 14 is of circular cross-section and provided with a longitudinal rib 20, and it is formed with a laterally-extending hollow boss 21 at its forward end for forming one coacting part of the pivotal connection 15.

Slidably arranged about the boom is a split clamp 22 of which the opposed edges of the split can engage the adjacent sides of the rib 20; and a double-ended bolt 23, extending across the split, has extending ends which pass through bores of bosses 24, 24 fast at the one ends of the handle bars. The engaging faces of these bosses, and the outer surfaces of coacting bosses 25, 25 fast with the split clamp, are provided with inter-engaging radial teeth 26 such that when a wing-nut 27 on either outer end of the screw 23 is slackened, the associated handle-bar can be moved to a new tilted position and afterwards be locked therein by re-tightening the wing-nut.

The bolt 23 has a central transverse hole containing a radially-extending pin 28 which will abut one of the bosses 25 to provide a substantial axial location for the said bolt for enabling one of the arms to be held in an adjusted position by its associated wing-nut when the other wing-nut has been slackened to enable the other arm to be adjusted independently. Obviously by slackening both wing-nuts the angle of both handle-bars can be adjusted.

If it is desired to detach the rotor, and to substitute by another implement (e.g., a plough share) which extends rearwardly towards a walking operator to a different extent, all that is necessary for enabling the operator to be provided with desirable foot-room is to slacken the wing-nuts and slide the clamp to an appropriate longitudinal position along the boom, whereafter the wing-nuts will be re-tightened to hold the handle-bars in the selected position.

What I claim as my invention and desire to secure by Letters Patent of the United States is:

1. A power-driven cultivating machine having a handle-bar means for a walking operator comprising a boom supported from the machine, a handle-bar, said boom of circular cross-section but with a longitudinal rib on its exterior, and a split clamp means attached to said handle-bar, the split of said split clamp means adapted to contain said longitudinal rib, said split clamp means when released adapted to be slid along said boom with said longitudinal rib preventing rotation of said split clamp means on said boom, and said split clamp means when tightened adapted for its surfaces on opposite sides of its split to engage the adjacent surfaces of said longitudinal rib to locate said split clamp means longitudinally of said boom.

2. A power-driven cultivating machine having a handle-bar means for a walking operator comprising a boom of circular cross-section supported at one end from the machine, said boom provided exteriorly with a longitudinal rib, a split clamp means on said boom with said longitudinal rib within its split, and two handle-bar arms, said handle-bar arms attached at one end to said split clamp means, said split clamp means when released adapted to be slid along said boom with said longitudinal rib preventing rotation of said slit clamp means on said boom, and said split clamp means when tightened adapted for its surfaces on opposite sides of its split to engage the adjacent surfaces of said longitudinal rib to locate said split clamp means longitudinally of said boom.

3. A power-driven cultivating machine having a handle-bar means for a walking operator comprising a boom of circular cross-section supported at one end from the machine, said boom provided exteriorly with a longitudinal rib, a split clamp means on said boom with said longitudinal rib within its split, said split clamp means including a screw extending across its split clear of said boom, two handle-bar arms, said handle-bar arms journalled at one end about extending ends of said screw, and nuts on the extremities of said extending ends of said screw, said nuts when slackened permitting said split clamp means to be slid along said boom with said longitudinal rib preventing rotation of said split clamp means on said boom, and said nuts when tightened clamping said handle-bar arms to said split clamp means and urging the surfaces of said split clamp means at opposite sides of its split to engage the adjacent surfaces of said longitudinal rib to locate said split clamp means longitudinally of said boom.

4. A power-driven cultivating machine having a handle-bar means for a walking operator comprising a boom of circular cross-section supported at one end from the machine, said boom provided exteriorly with a longitudinal rib, a split clamp means on said boom with said longitudinal rib within its split, said split clamp means including a screw extending across its split clear of said boom, means axially locating said screw, two handle-bar arms, said handle-bar arms journalled at one end about extending ends of said screw and at opposite sides of said split clamp means, said handle-bar arms having lateral faces adjacent lateral faces of said split clamp means, said lateral faces of said handle-bar arms and of said split clamp means provided with coacting axially-directed serrations, and nuts on the extremities of said extending ends of said screw, said nuts when slackened permitting said split clamp means to be slid along said boom with said longitudinal rib preventing rotation of said split clamp means on said boom, either of said nuts when further slackened permitting disengagement of the coacting serrations of the associated handle-bar arm and split clamp means face whereby to permit the inclination of the said handle-bar arm to be adjusted, and said nuts when tightened clamping the serrations of both handle-bar arms in engagement with the coacting serrations of said split clamp means and urging the surfaces of said split clamp means at opposite sides of its split to engage the adjacent surfaces of said longitudinal rib to locate said split clamp means longitudinally of said boom.

References Cited in the file of this patent

UNITED STATES PATENTS

| 643,647 | Harmon | Feb. 20, 1900 |
| 1,987,676 | Geffroy | Jan. 15, 1935 |

FOREIGN PATENTS

| 113,218 | Sweden | Feb. 13, 1945 |
| 1,110,413 | France | Oct. 12, 1955 |